INVENTOR.
HENRY F. MISEROCCHI

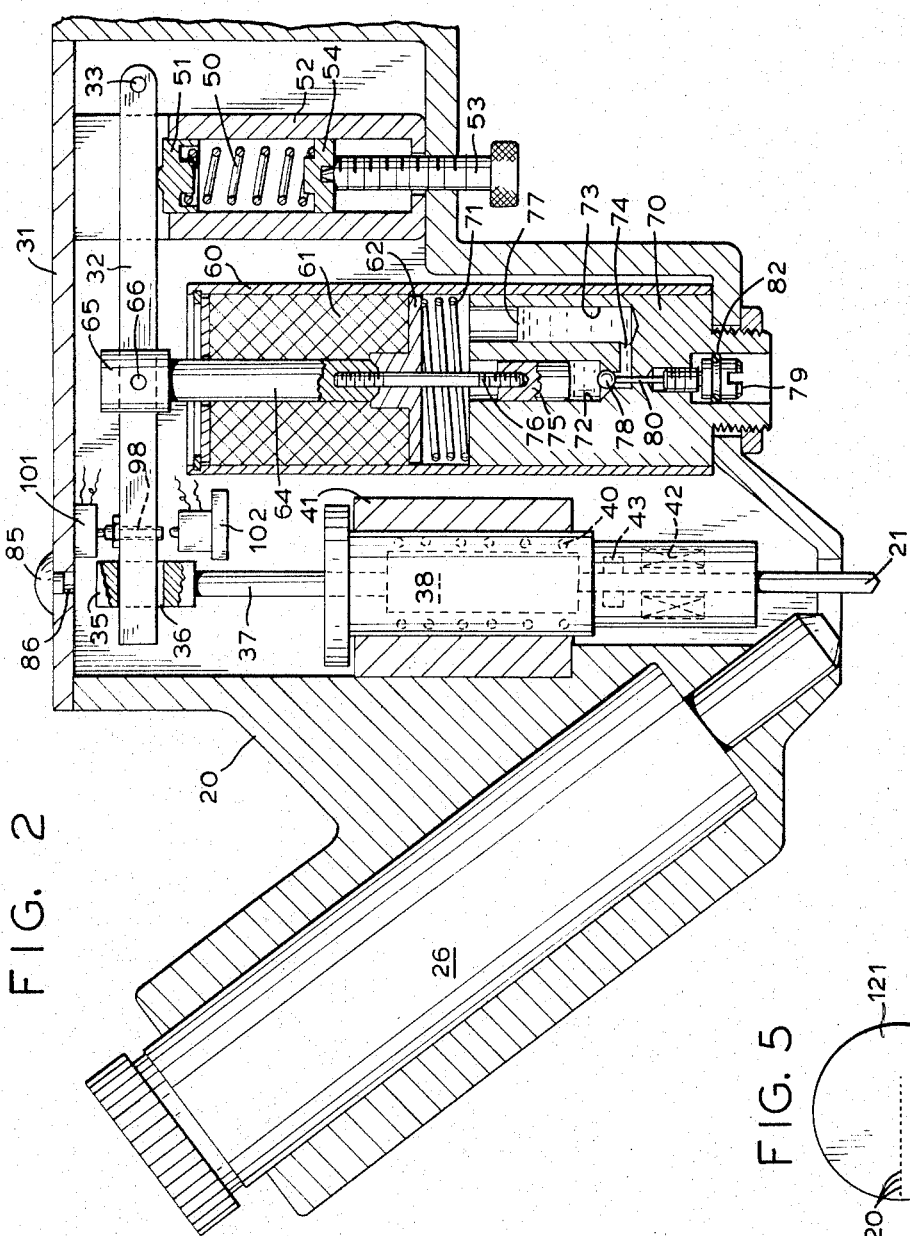
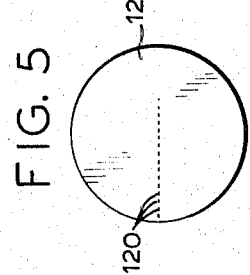

Jan. 30, 1968   H. F. MISEROCCHI   3,365,937
RESONANT SENSING DEVICE
Filed Jan. 26, 1965   3 Sheets-Sheet 3

INVENTOR.
HENRY F. MISEROCCHI
BY
Erwin B. Steinberg
AGENT.

United States Patent Office 3,365,937
Patented Jan. 30, 1968

3,365,937
RESONANT SENSING DEVICE
Henry F. Miserocchi, Cos Cob, Conn., assignor, by mesne assignments, to Branson Instruments, Incorporated, Stamford, Conn., a corporation of Delaware
Filed Jan. 26, 1965, Ser. No. 428,089
4 Claims. (Cl. 73—81)

ABSTRACT OF THE DISCLOSURE

A resonant sensing device which is adapted to determine the physical properties of material is mounted via motion producing means for cyclic reciprocating motion relative to a workpiece disposed on a table. The table is mounted for traverse motion so controlled as to cause incremental displacement of the workpiece when one cyclic reciprocating motion has occurred, thus providing for automatic profile measurement.

This invention refers to resonant sensing device which is adapted to determine or test the physical properties and characteristics of a workpiece. More specifically, this invention has reference to a reasonating probe cooperating with various mechanisms and electrical circuits to provide a hardness tester which is adapted to operate fully automatically either at a particular predetermined location or incrementally advance the area of a workpiece subjected to test along a selected path.

In the prior art, particularly in U.S. Letters Patent No. 3,153,338 issued to C. Kleesattel, dated October 20, 1964 entitled, "Resonant Sensing Devices" there is described a novel instrument for determining and measuring the physical properties of material, such as the hardness of a piece of metal and the like. Briefly, the device comprises a slender elongated rod of magnetostrictive material which is vibrated longitudinally by an electromagnetic means encircling the rod and receiving its entry from a high frequency generator. This rod vibrates, or resonates, at a given frequency when a diamond tipped end of the rod is free. When, however, this end is brought in forced contact with a workpiece the hardness of which is to be measured, this one end is constrained and there will be a shift in the resonant frequency of the rod. Assuming that the force causing the contact engagement remains constant, then a soft material causes a deeper tip penetration than a hard material and, hence, the resonating frequency increases as the hardness of the material decreases. The shift in resonant frequency from the free condition to the constrained rod condition is a measure of the hardness of the material under test. A further and detailed description of the resonating probe principle is found in the patent stated.

The device described and illustrated in the reference patent requires considerably manipulation and, although very useful as a manual probe, it fails to meet all of the requirements when highest precision and repeatability of measurement are desired. Therefore, it has been necessary to design an instrument which can be set upon the exact point at which a hardness determination is to be made and then letting the instrument perform such hardness determination without human manipulation or intervention. In this way, an instrument of highest precision is achieved and the problems usually encountered with manually-held or operated probes are eliminated. Additionally, it has been possible to design an instrument and certain controls pertaining thereto in such a manner as to enable the hardness determination to take place along incremental points of a predetermined area in order to obtain a profile type hardness indication.

One of the objects of this invention is, therefore, the provision of a novel and improved resonant sensing device in combination with means for obtaining measurements characterized by high precision.

Another object of this invention is the provision of an improved hardness tester which operates automatically and provides an instantaneous indication of the hardness of the workpiece at the area under test.

Another object of this invention is the provision of a resonant probe hardness tester cooperating with various mechanical and electronic controls in order to assure high accuracy and repeatability of measurements.

A further object of this invention is the provision of a resonant sensing proble mounted for motion between a normal position and a test position, and means for controlling such motion.

Still another and further object of this invention is the provision of a resonant probe hardness tester having a movable stage for holding a workpiece and means for providing automatic incremental advance of the stage after each testing operation.

Further and still other objects of this invention will be more clearly apparent by reference to the following description when taken in conjunction with the accompanying drawings in which:

FIGURE 2 is an elevational view, partially sectioned, of certain active elements in FIGURE 1;

FIGURE 5 is a schematic plan view showing the type of profile hardness determination which can be made by the use of the foregoing apparatus and its control circuit.

General arrangement

Figure 1:
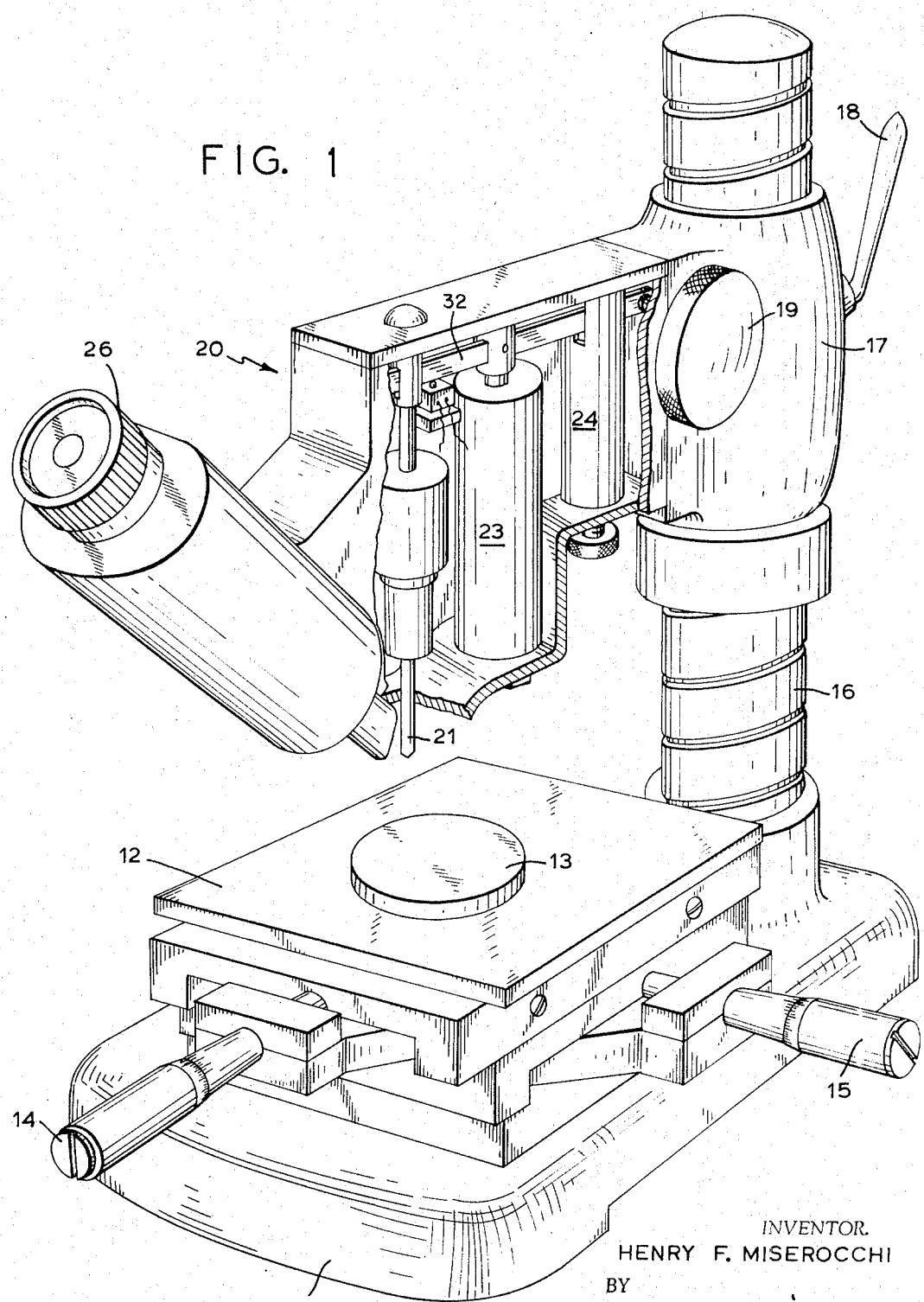
FIGURE 1 is a perspective elevational view, partially sectioned, of the mechanical portion of the resonant sensing device.

Referring now to the figures and FIGURE 1 in particular, numeral 11 identifies generally a cast base which supports a stage, or table 12, for resting thereon a workpiece 13 whose hardness, or surface characteristics, is to be determined. The table is movable in a horizontal plane along two mutually perpendicular axes by means of turnable handles 14 and 15.

A threaded standard 16 extends from the base 11 and supports a sleeved head 17 which is positionable about the standard by means of a lever 18 and a turnable knob 19. The head 17 is fitted with a support 20, which, in turn, supports substantially all of the hardness measuring equipment, particularly the resonating probe 21 and a vertical motion mechanism for this probe. The motion mechanism comprises essentially a pivoted lever 32, a solenoid and dashpot combination 23, and a force means 24 which urges the probe toward its raised position. The support 20 includes also a spotting microscope 26 which is adjusted and used to select the precise spot on the workpiece 13 which is to be contacted by the diamond tipped probe 21. While the distance between the tip of the resonating probe 21 and the workpiece 13 as depicted for the sake of clarity is quite large, it shall be understood that when adjusted for operation this distance is relatively small, being only in the order of 0.100 inch.

Mechanical design

FIGURE 2 shows the more pertinent mechanical parts in greater detail. The support 20 is provided with a cover plate 31. Underneath the cover plate there is found the horizontal lever 32 mounted for pivotal motion about a pin 33 which is secured to the support 20. At the opposite end of the lever 32, there is disposed a bracket 35 having an aperture 36 through which the lever extends. The bracket 35 is fastened to a rod 37 which terminates in a plunger 38 from which, in turn, the resonating probe 21 extends. The plunger is supported for longitudinal reciprocal motion by a sleeve ball bearing 40 which is fastened in a cylindrical housing 41 which is held by the support 20. The resonating probe is free to move relative to a stationary electro magnetic excitation coil 42 which is used to cause longitudinal vibrations in the magnetostrictive probe. Additionally, the probe is fitted with a piezoelectric transducer 43 mounted at a nodal point of the probe to provide electric feedback signals corresponding to the frequency of the vibrations of the probe. This electrical excitation and pickup circuit is described in greater detail in co-pending application for U.S. Letters Patent of Norman G. Branson, Serial No. 423,214, filed January 4, 1965, entitled, "Control Circuit for Resonant Sensing Device," now U.S. Patent 3,323,352 issued June 6, 1967.

As constructed and shown in FIGURE 2 the resonating probe 21 attached to the plunger 38 and in turn to the bracket 35 is capable of limited motion along the vertical longitudinal axis, the precise amount of such motion being controlled by the pivotal motion of the lever 32 and the distance between the probe end and the workpiece.

The resonating probe is normally maintained in the raised position by the lever 32 due to the force exerted by the helical compression spring 50 acting upon a slidable bushing 51 which is in contact with the underside of the lever 32 at the opposite lever end. The spring is confined in a cylindrical cup shaped housing 52. The force exerted by the spring upon the lever can be regulated by turning the adjusting screw 53 which is in threaded engagement with the support 20. Turning the screw raises or lowers the washer 54 which constitutes the bottom support for the spring 50.

Lowering of the resonant probe 21 to provide engagement with the workpiece 13 is provided by a solenoid and dashpot arrangement 23 which includes generally a housing 60, a solenoid 61 fastened therein, a bushing 62 of magnetic material, and a centrally located plunger 64 which is secured to the lever 32 by means of a block 65 and a pin 66. Upon energizing the solenoid 61, the plunger 64 is urged into a downward stroke toward the bushing 62.

The downward stroke motion of the plunger 64 is controlled by a dashpot arrangement which comprises, essentially, a block 70 held in spaced relationship from the magnetic bushing 62 by a helical spring 71, a first vertical bore 72 and a second vertical bore 73, both bores being inter-connected by an L-shaped transverse channel 74. The first bore 72 is fitted with a piston 75 which is fastened to the plunger 64 by means of a connecting pin 76. On the downward stroke of the plunger 64, the piston 75 exerts pressure on the hydraulic liquid 77, preferably oil, which tries to escape around a steel ball 78 and through the channel 74 into the vertical bore 73. The rate of escape of the hydraulic liquid can be controlled by a screw 79 which is provided with a pin 80 for raising or lowering the ball 78 with respect to the inlet to the channel 74. During the upward or return stroke of the plunger 64, the liquid 77 flows quite rapidly from the bore 73 into the bore 72 as the ball 78 is free to lift under the influence of the liquid flow. An O-ring gasket 82 provides a seal between the screw 79 and the block 70.

One important feature of this invention resides in the dimensioning of the aperture 36 in the bracket 35 relative to the lever 32. This aperture 36 is provided with sufficient clearance with respect to the lever so that the resonating probe 21, when in contact with the workpiece 13, exerts merely the force of the weight of the probe 21, plunger 38, rod 37 and bracket 35, but is not pressed into contact with the workpiece by the force of the solenoid 61 acting upon the lever 32. In a typical model the weight is about 300 grams, the device thereby constituting a microhardness tester. If additional weight is desired, a plug 85 is removed from the cover plate 31 and weights of predetermined size brought in contact with the bracket 35 through the aperture 86. Therefore, under normal conditions the spring 50 holds the lever 32 in the raised position and energizing of the solenoid 61 provides sufficient force to overcome the force exerted by the spring 50, thereby causing the resonating probe 21 to be lowered and engage the workpiece 13 resting on the table 12. Two electrical switches with normally closed contacts are provided to sense the raised and the lowered position of the lever 32, namely switch 101 mounted to sense the condition when the lever and the resonating probe 21 are in the raised position and switch 102 sensing the condition when the lever and the probe are in the lowered position, both switches being actuated by a screw 98 which is fastened to the lever 32.

*Motion control circuit*

Figure 3:
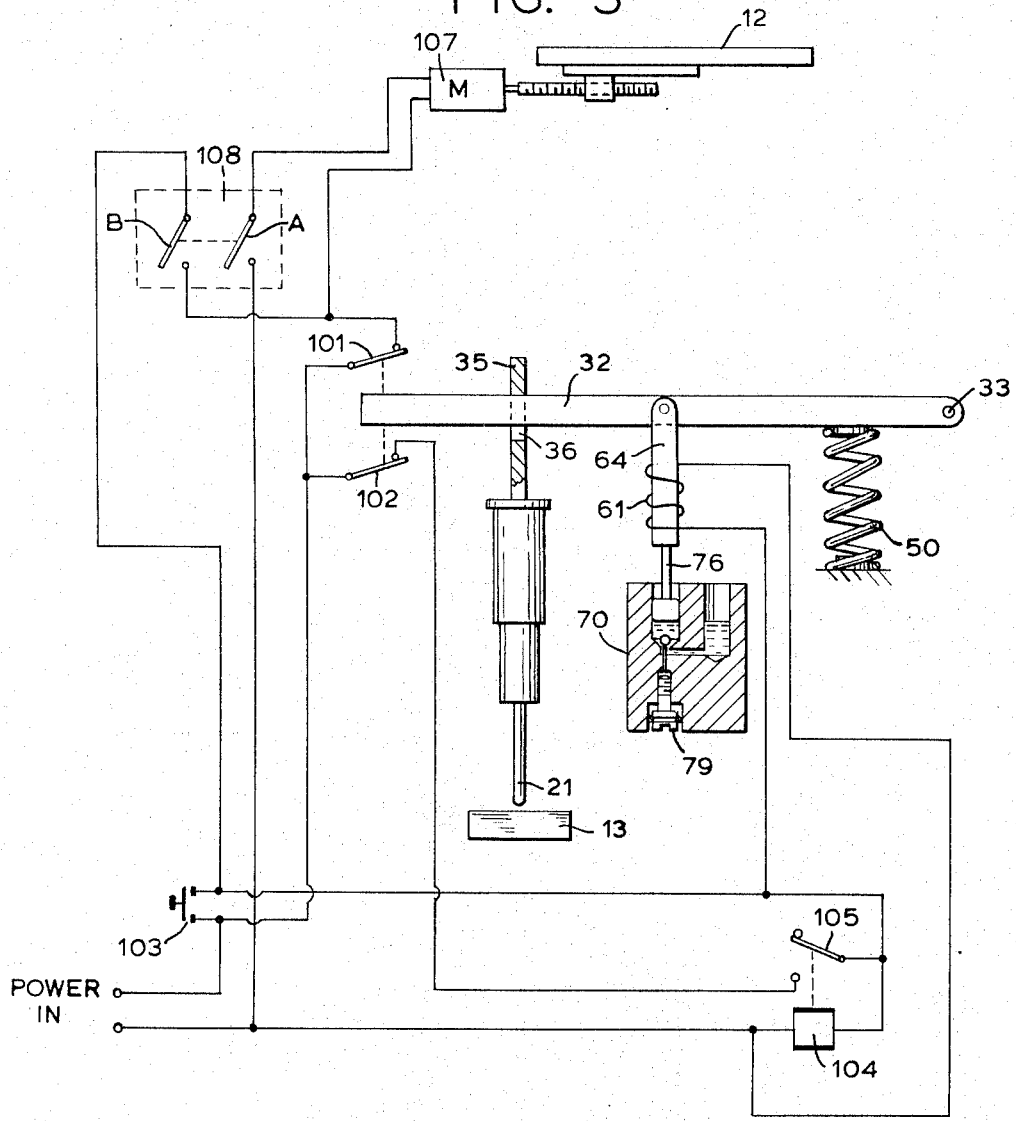
FIGURE 3 is a schematic electrical circuit diagram of the motion control means.

The single cycle operation of the probe from its normally raised position to its actuated position at which it is in engagement with the workpiece and its return to the raised position can be followed from the following description. Switch 108 is in the open position as shown in FIGURE 3. Upon momentarily closing push button switch 103, relay coil 104 receives energy and closes associated contact switch 105. Switch contact 105 is a holding contact and keeps the circuit closed via the normally closed switch 102 which opens when the lever 32 reaches its fully lowered position. Solenoid 61 is connected in parallel with the relay coil 104 and energized solenoid 61 causes lowering of the lever 32 at a rate of speed which is controlled by the screw adjustment 79 of the dashpot. Thus, the diamond tipped end of the probe 21 is brought into engagement with the workpiece 13. This engagement continues until the switch 102 is opened by the lever 32. Opening of the switch 102 breaks the holding circuit to the relay coil 104, thus opening the associated contact 105 which also breaks the connection to the solenoid 61 and, hence permitting spring 50 to raise the lever 32 to its topmost position. This completes one cycle. By operation of turnable handles or knobs 14 or 15, FIGURE 1, a new point of the workpiece 13 is brought into alignment underneath the resonating probe 21 and upon momentarily closing switch 103, the reciprocating motion of the probe 21 is repeated. The aperture 36, FIGURE 2, in bracket 35 and the opening of the switch 102 is adjusted such that the probe 21 engages the workpiece 13 prior to the lever 32 reaching the limit of its downward travel, thus obtaining a period of dwell during which the probe 21 is in steady engagement with the workpiece 13 for hardness determination.

*Automatic profile type measurement*

On certain specimens it is desired to obtain several measurements along an incremental path of the test surface. This condition is indicated in FIGURE 5 where measurements are taken along consecutivee points 120 of the workpiece 121. In order to accomplish this automatic step-by-step operation, there is included in FIGURE 3 a switch 108 and one or more of thee turnable knobs 14 and 15 respectively in FIGURE 1 is replaced by a step motor 107 or other suitable device such as a rotary motion solenoid. As shown in this figure, the step motor 107 replaces one of the turntable knobs thereby obtaining stepped incremental motion along one single axis. It will be apparent to those skilled in the art, however, that a second motor may be provided to obtain displacement along two axes and that other control means may be provided to obtain zig-zag motion by suitably sequencing the respective step motors. For automatic displacement of the workpiece relative to the resonating probe 21, the switch 108 is changed to the closed position. Closing of switch 108 establishes via closed switch contact 108A and switch 101, a circuit to motor 107, causing an incremental motion of the tablee 12. Switch contact 108B establishes a circuit via closed contact 101 to the relay coil 104. Contact 105 associated with the coil 104 is closed as described previously and upon opening of switch 102, the downward motion of the lever is stopped. When the lever reaches its fully raised position, switch 101 is closed again, thus repeating the cycle. In this way, a cyclical operation of the resonating probe is obtained which operation is interconnected with an incremental table displacement.

Figure 4:
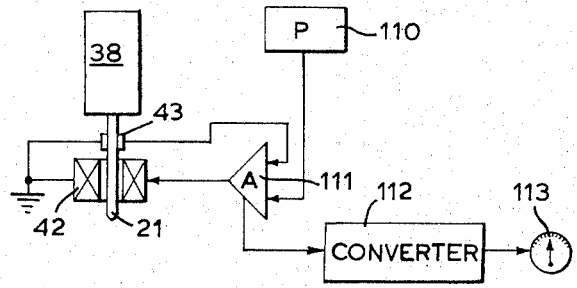
FIGURE 4 is a schematic electrical circuit diagram of the hardness determination and read-out circuit.

The electrical read-out circuit for hardness determination is shown in FIGURE 4 and is identical with the circuit described in the co-pending application of Norman G. Branson, supra. A supply of power 110 is used to furnish power to a feedback amplifier 111 which drives the electromagnetic coil 42 to providee longitudinal vibrations in the magnetostrictive probe 21, causing the probe to resonate at its resonant frequency. A signal corresponding to the resonant frequency of the probe 21 is taken from the piezoelectric pickup device 43 which is mounted to the probe 21 and such signal is fed to the amplifier 111 as a feedback signal.

A signal corresponding to the resonating frequency of the probe is fed from the amplifier 111 to a frequency to current converter 112. The magnitude of the current is displayed on a meter 113 which thereby indicates a signal responsive to the fresuency of the probe which, as has been explained heretofore, is a measure of the surface hardness of the workpiece, i.e. the softer the material under test, the greater the frequency shift from the free resonance condition. It will be apparent that other read-out circuits may be used without deviating from the principle of this invention.

While there has been illustrated and described a certain preferred embodiment of this invention, it will be apparent to those skilled in the art that various changes and modifications may be made therein without deviating from the broad principle and intent of this invention, which shall be limited only by the scope of the appended claims.

What is claimed is:

1. A resonant sensing device comprising:
    a probe adapted to oscillate and having one end which is adapted to engage a workpiece with a predetermined force;
    driving means coupled to said probe for causing said probe to oscillate at its resonant frequency when said one end engages a workpiece;
    electrical circuit means coupled to said driving means for oscillating said probe and indicating a value commensurate with the resonant frequency thereof;
    a mounting means and a table for respectively supporting in predetermined spaced relation said probe and a workpiece;
    motive means coupled to said mounting means and said probe for moving, when actuated, said one end of said probe toward said table whereby said one end is adapted to engage a worpiece supported on said table;
    control means coupled to said motive means for causing motion of said one end of said probe toward said table for engaging a workpiece supported thereupon, briefly retaining said one end at that position, and then returning said one probe end to its original position, and
    further means coupled to said table and said control means for providing incremental displacement of said table relative to said mounting means for moving the area of the workpiece presented to said one probe end subsequent to said probe end having engaged the workpiece.

2. A resonant sensing device comprising:
    a base;
    a table disposed on said base for supporting thereon a workpiece;
    means for adjustably positioning said table relative to said base;
    a standard vertically extending from said base;
    a head supported on said standard and adjustably posionable relative to said table;
    a support supported by said head and said support including:
    a probe adapted to resonate and having one end which is adapted to engage a workpiece disposed on said table;
    driving means coupled to said probe for causing said probe to resonate at its resonant frequency when said one end engages a workpiece;
    a pivotally mounted lever coupled to said support and to said probe for providing reciprocating motion of said probe end toward and away from said table;
    motive means coupled to said lever for causing, when actuated, reciprocating motion of said probe end;
    motion control means coupled to said lever for adjustably controlling the rate of speed of said reciprocating motion;
    a further control and readout means coupled respectively to said motive means and to said probe for actuating said motive means and for indicating a value responsive to the resonant frequency of said probe when said probe end is in engagement with a workpiece, and
    additional means coupled to said table and said further control means for incrementally displacing said table in sequence with the reciprocating motion of said probe.

3. A resonant sensing device comprising:
    a probe adapted to oscillate and having one end which is adapted to engage a workpiece with a predetermined force;
    driving means coupled to said probe for causing said probe to oscillate at its resonant frequency when said one end engages a workpiece;
    electrical circuit means coupled to said driving means for oscillating said probe and indicating a value commensurate with the resonant frequency thereof;
    a mounting means and a table for respectively supporting in predetermined spaced relation said probe and a workpiece;
    motive means which include a pivoted lever coupled to said probe, and a solenoid and a resilient biasing means coupled to said lever for moving, responsive to actuation of said solenoid, said one probe end toward said table for providing engagement between said one probe end and a workpiece, and said biasing means breaking such engagement when said solenoid is de-energized, and
    control means which include means for sensing the position of said lever relative to a workpiece on said table coupled to said solenoid for causing said solenoid to be sequentially energized and de-energized whereby said one end is cyclically moved into and out of engagement with a workpiece.

4. A resonant sensing device as set forth in claim 3 and including means for providing a momentary dwell period while said one probe end is in engagement with a workpiece.

References Cited
UNITED STATES PATENTS

| | | | |
|---|---|---|---|
| 2,722,831 | 11/1955 | Smith | 73—81 |
| 2,996,928 | 8/1961 | Watson | 251—138 |
| 3,077,771 | 2/1963 | Ernst | 73—81 |
| 3,123,995 | 3/1964 | Cosner | 73—81 |
| 3,153,338 | 10/1964 | Kleesatael | 73—78 |

RICHARD C. QUEISSER, *Primary Examiner.*

C. IRVIN McCLELLAND, *Assistant Examiner.*